July 6, 1948.   W. KELLGREN ET AL   2,444,830
ADHESIVE SHEETS AND METHOD OF MAKING
Filed April 4, 1938
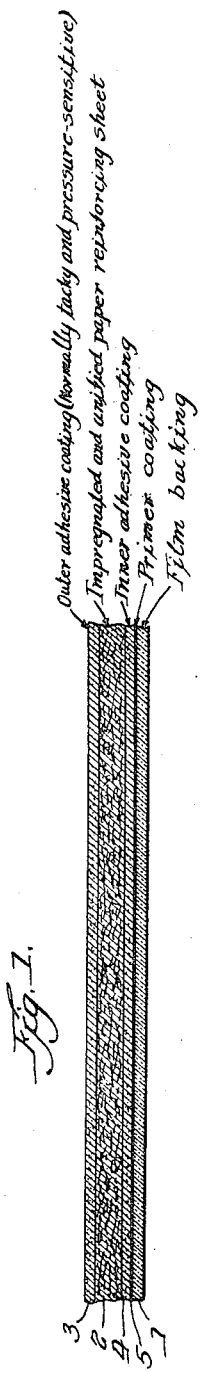
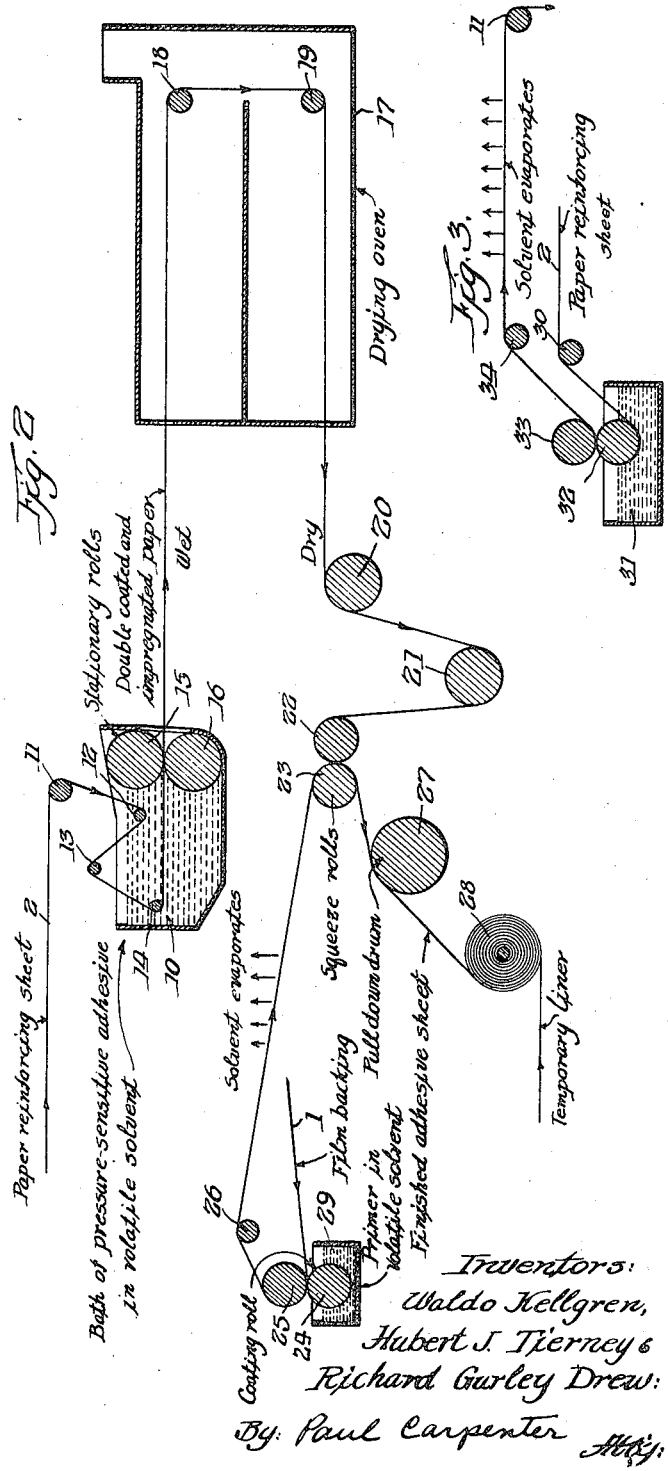
Inventors:
Waldo Kellgren,
Hubert J. Tierney &
Richard Gurley Drew:
By: Paul Carpenter Atty.

Patented July 6, 1948

2,444,830

UNITED STATES PATENT OFFICE 2,444,830

ADHESIVE SHEET AND METHOD OF MAKING

Waldo Kellgren, St. Paul, Hubert J. Tierney, Mahtomedi, and Richard Gurley Drew, St. Paul, Minn., assignors to Minnesota Mining & Manufacturing Company, St. Paul, Minn., a corporation of Delaware Application April 4, 1938, Serial No. 199,942

20 Claims. (Cl. 154—136)

This invention relates to pressure-sensitive adhesive sheets, conveniently in the form of tapes, characterized by having a flexible film or non-fibrous sheet backing, and a unified thin flexible paper reinforcing sheet which is coated on both sides with pressure-sensitive adhesive and firmly laminated to the backing to form a permanently unitary product which is thin, flexible and strong.

This tape possesses the attractive and desirable qualities of ordinary film-backed adhesive tapes but is stronger, having greater tensile strength and resistance to tear. It may be rolled or stacked without the use of a slip sheet and unrolled or removed without splitting or delamination and without offsetting of adhesive upon the back of the adjacent tape from which it is separated. It may be applied to various surfaces for sealing purposes and removed in condition for reuse and without leaving a residue of adhesive upon the surface, although characterized by an aggressive adhesiveness permitting of good adherence.

Adhesive tapes prepared in accordance with this invention are of general utility and may be made to serve as removable and reusable packaging tape, can-sealing tape, tape to replace viscose coverings on bottles, ceramic tape, electrical tape, repair tape, tape for making labels and index tabs, frost shield tape, etc., and in general may be applied to any analogous purpose for which a wrapping, covering, sealing, joining or splicing pressure-sensitive adhesive tape is desired.

Adhesive tapes may be prepared which are transparent or semi-transparent, so that they may be applied without concealing the coloring or markings of the surface to which applied. Coloring material in dye or pigment form may be incorporated in the adhesive or in the backing. When a transparent backing is used, it may be printed in reverse, on the face which carries the adhesive and prior to coating, to provide an adhesive sheet with the printing visible through and protected by the backing.

The adhesive is "normally tacky and pressure-sensitive," by which it is meant that under ordinary atmospheric conditions the adhesive is stably in a condition such that it does not need to be activated by solvents or heat or otherwise prepared in order to secure good adherence to surfaces against which the adhesive tape may be pressed, to result in an aggressive adhesive bonding to the surface which resists separation therefrom except by a force greater than the pressure necessary to obtain adhesion. Furthermore, a "non-offsetting" adhesive layer is provided, meaning that the adhesive is possessed of such coherence in relation to adhesiveness and is so firmly united to the backing and to the reinforcing sheet that the adhesive sheet or tape may be stacked or rolled upon itself without offsetting of adhesive upon separation or unwinding for use, and may be separated in a condition for reuse from surfaces (not possessing special chemical affinity for the adhesive), to which it may have been temporarily applied, without offsetting of adhesive material. Hence the term "non-offsetting" designates an important physical or chemico-physical property or characteristic of the adhesive.

By a "unified" paper reinforcing sheet, it is meant that the paper is impregnated with a material which binds or welds the fibres together, so that the paper will not split or the fibres pull loose under the force exerted by the normally tacky and pressure-sensitive adhesive coating when the product is unwound from rolls or removed from surfaces to which temporarily applied—that is, a fibre unity is present which prevents the unity of the reinforcing sheet from being destroyed by the pull of the adhesive. The unified sheet, because of the increased fibre unity, has an increased tensile strength and resistance to tear.

The paper may be unified by impregnation with the normally tacky and pressure-sensitive adhesive itself, so that this material both unifies and coats the reinforcing sheet, making it possible to unify and double-coat the sheet in a single operation. Or the paper may be unified with a different composition, which will not render the sheet stiff and for which the pressure-sensitive adhesive material has a strong affinity, and then be subsequently coated with the pressure-sensitive adhesive. Or the reinforcing paper may be partly unified by the pressure-sensitive adhesive penetrating into it from one or both sides and partly unified by another unifying impregnant. In any case, there is not a mere superficial penetration by a coating material but a thorough saturation or impregnation to produce a truly unified paper.

The normally tacky and pressure-sensitive adhesive of this tape serves not only to provide an exposed adhesive surface, but the inner coating thereof on the back side of the reinforcing sheet serves to unite or bond the latter to the film backing. It is preferred, especially when the face side of the film backing, which carries the adhesive, is of a smooth lustrous non-porous nature, to provide an interposed primer coating in order to secure greater anchorage of the inner adhesive coating to the backing and fully guard against subsequent delamination of the adhesive sheet.

The backing is of the flexible film type, that is, it is a thin flexible non-fibrous sheet which may be transparent, translucent or opaque, and is characterized by a smooth dense non-porous surface which may be, and preferably is, lustrous or glossy. Representative backings are lustrous non-fibrous cellulosic films such as films of regenerated cellulose (normal Cellophane), cellulose esters (as cellulose nitrate, cellulose acetate and cellulose aceto-butyrate), cellulose ethers (as ethyl cellulose and benzyl cellulose), and Cellophane which has been waterproofed or moistureproofed on one or both sides by a lacquer or resin coating which is firmly bonded; all of which film materials may and generally do contain plasticizers to increase flexibility and suppleness. Other illustrative backings are films of rubber hydrochloride, chlorinated rubber, synthetic resins, and metallic films such as foil made of aluminum, tin, copper or zinc and alloys thereof, etc. When Cellophane is used, a preferred thickness is "300 point" (0.88 mil), but where extreme thinness and flexibility of the adhesive tape is not so important, Cellophane of "450 point" (1.25 mils) or "600 point" (1.75 mils) may be used, for example.

An undesirable characteristic of such thin non-fibrous films is lack of strength (i. e., a low internal cohesiveness in one or both directions) which is manifested in any given case by one or more of such attributes as low tensile strength, brittleness (either initially or after aging), tendency to crack on flexing, tendency to easily tear, and tendency of adhesive coatings to offset upon unwinding of adhesive tape from rolls or removal from surfaces. An object of this invention is to use such a backing, because of its desirable characteristics, and yet to overcome the lack of strength, but without making the tape as a whole undesirably thick, stiff or unattractive, or have a tendency to delaminate when unwound from rolls or removed from surfaces to which temporarily affixed, or have a tendency to unduly curl, buckle or warp because of lack of elastic equilibrium between its constituent parts.

The paper reinforcing sheet should be thin, flexible, of open texture so as to be highly porous, and should be tough and strong. We prefer to employ a thin sheet of long-fibred rope paper of open texture. Rope paper is made from hemp fibres and is quite tough and strong even when thin and open textured.

Such paper is exemplified by "Troya Tissue," made of purified Manila hemp fibres. The fibres range from ¼ to ½ inch in length and mostly run in a direction lengthwise of the web, which is advantageous in that when adhesive tapes are made with the fibres of the reinforcing sheet running lengthwise, there will be a greater lengthwise tensile strength and resistance to crosswise tear than would otherwise be possible. Paper of 2 mil thickness, for example, weighs 14 lbs. per ream (i. e., 480 sheets 24 in. by 36 in., or the equivalent, weighs 14 lbs.); and has a lengthwise tensile strength of 16½ lbs. per inch width and a crosswise tensile strength of 2 lbs. Paper of 1½ mil thickness weighs 12 lbs. per ream, has a lengthwise tensile strength of 16 lbs. and a crosswise tensile strength of 2 lbs. The high porosity is indicated by the fact that 10 thicknesses of either the 2 mil or 1½ mil paper require only 5 seconds to pass 400 cc. of air through a 1⅛ inch diameter opening on the Gurley densometer (original model, No. 4100). The high porosity may also be indicated by the statement that for the 2 mil paper it is 5 to 25 times greater than that of absorbent paper towelling, comparing equal test thicknesses. This brings up the point that porosity and absorptiveness are not synonymous. Porosity is required in order that the unifying impregnant may adequately penetrate between the fibres.

The paper thickness to be used for present purposes is preferably 1 to 4 mils, and we ordinarily use a thickness of 1½ or 2 mils, which permits of a high degree of flexibility in the finished adhesive sheet and for greater transparency when the latter is desired.

Another example of rope paper is "Dextilose," in which the fibres are also of hemp, but which differs in that the paper has substantially the same lengthwise and crosswise tensile strength and tear resistance.

The invention is illustrated by the following embodiments.

In the accompanying drawing:

Fig. 1 is a diagrammatic magnified section of an adhesive sheet showing the constituent parts;

Fig. 2 is a diagrammatic representation showing a continuous method of making such adhesive sheeting; and Fig. 3 shows a method of presaturating the reinforcing paper.

Referring to Fig. 1, there is shown the combination of a film backing 1; impregnated and unified paper reinforcing sheet 2 which is coated on both sides with normally tacky and pressure-sensitive adhesive forming outer adhesive coating 3 and inner adhesive coating 4; and primer coating 5 interposed between the inner adhesive coating and the backing; forming a permanently unitary adhesive sheet.

For purposes of illustration, the approximate thicknesses of the various layers or films will be given for a representative embodiment of the invention, viz: film backing (1) of "300 point" normal Cellophane—0.9 mil, unified Troya Tissue paper reinforcing sheet (2)—2 mils, outer and inner adhesive coatings (3 and 4)—0.9 mil, primer coating (5)—0.1 mil. Thus the total thickness of the adhesive sheet is about 5 mils (0.005 inch). The thicknesses may of course be varied somewhat, but we prefer to employ a combination yielding an adhesive sheet having a thickness of not over about 8 mils, in order to secure a high degree of flexibility and to avoid a sheet differing greatly in thickness from ordinary adhesive sheets which do not have a reinforcing sheet component.

Referring to Fig. 2, the paper, in the form of a continuous web from a supply roll, is double-coated and impregnated by passing through a bath 10 of adhesive solution; the paper passing over and rearwardly under roller 11 (located above the solution), thence into the bath and under roll or rod 12, thence upwardly out of the bath (to allow air to escape from the web) and over roll 13, thence down into the bath and under roll 14 in a forward direction so that it moves horizontally through the bath to stationary rolls 15 and 16, which form an exit orifice and are spaced to secure the desired thickness of coating. A suitable diameter for these orifice rolls is 8 inches.

The wet, coated and impregnated paper web then passes through a drying oven 17, for solvent removal, moving horizontally forward through an upper duct maintained at a temperature of about 150–160° F., until substantially dry, then down over rollers 18 and 19 and back through a lower duct maintained at a temperature of about 140–150° F., to complete the drying, and thence out of the oven and down over roller 20, which may be a drum cooled by circulation of water through the interior. While "dry," the web is tacky and pressure-sensitive on both faces owing to the nature of the adhesive. It passes down under roller 21 and then up over roll 22, which is one of a pair of horizontally positioned squeeze rolls 22 and 23, and then meets the primed backing film and passes with it down between the rolls.

The Cellophane film backing 1 is taken from a supply roll as a web of slightly greater width than the paper web, and passes between a pair of horizontal, vertically positioned coating rolls 24 and 25, the former of which is lowermost and dips into a bath 29 of primer coating composition, thereby becoming coated on the lower face with a thin film of the composition. The coated Cellophane then passes up and over roller 26 and is drawn to squeeze roll 23, the coated face being uppermost, and the distance of travel being great enough so that the primer coating will have become substantially dried by evaporation of the solvent before reaching the squeeze roll.

The paper, coated on both sides with tacky and pressure-sensitive adhesive, and the primed Cellophane, meet as they pass down between squeeze rolls 22 and 23, and are firmly pressed together, the adhesive becoming firmly united to the primer coating of the Cellophane because of their mutual affinity, so that a permanently unitary adhesive sheet results. The squeeze rolls are set so that sufficient pressure will be exerted to insure squeezing out air from between the two webs as they come together, and to insure adequate bonding together to prevent delamination in subsequent normal use.

The resultant adhesive sheet passes over driven pull drum 27, which contacts the adhesive side and which serves to draw the adhesive sheet from the squeeze rolls and to draw the sheet materials clear through the various treatments without intermediate driving means being needed, and is then wound up in a temporary roll 28, a temporary liner being wound in. This roll is subsequently unwound and the adhesive sheet slit and wound into rolls of desired width.

The above-described method of combining the coated paper and the primed backing is greatly preferred to any method in which the adhesive or primer, or both, have not been substantially dried prior to lamination. If the latter is the case, volatile solvent will be trapped between the paper and the backing and will form bubbles or pockets which not only mar the appearance but weaken the bond.

Referring now to Fig. 3, there is shown an optional pretreatment of the paper before it enters the above-described adhesive bath 10. The paper web passes over roller 30 and then down at an angle into bath 31 of saturating solution, so that both sides will be exposed to the solution; passes under roller 32 (which dips into the solution) and then back up between roller 32 and overlying roller 33, which is spaced so as to remove excess solution from the surface of the paper; and then passes over roller 34 and moves to roller 11 and down into bath 10. In passing between rollers 34 and 11, which are suitably spaced, the volatile vehicle of the saturating solution is permitted to evaporate; and this may be facilitated, if desired, by providing heating means.

This pretreatment may constitute a preliminary unification with pressure-sensitive adhesive solution of the same kind that is used as bath 10, but is more dilute so as to be less viscous, making for a more complete penetration of adhesive solids into the middle interior of the paper—an expedient which is desirable when dealing with paper of greater thickness and density than can be easily unified by impregnation in the concentrated solution alone. The bath may be comprised of the concentrated solution, as illustrated in examples hereafter set forth, thinned by adding a greater amount of solvent. Thus in Example 1, the ratio of solvent to rubber, by weight, is about 5 to 1, and this may be increased to 15–30 to 1 for the pre-saturation bath.

The pretreatment may, however, be for the purpose of unifying the paper with a composition which is relatively non-tacky and which would not be suitable for the adhesive coatings, but which is effective in unifying the fibres of the paper, and which should be of a kind toward which the adhesive proper has a strong affinity, so that the subsequently applied adhesive coatings will be firmly anchored. This unifying composition is dispersed in a volatile liquid vehicle in a proportion permitting the impregnant solids to thoroughly saturate and unify the paper, and the resultant solution is used as bath 31. An example of a suitable composition is set forth hereafter under the heading "Separate unifying composition."

In the following examples of compositions, given for purposes of illustration rather than limitation, all parts are by weight.

*Primer composition*

| | Parts |
|---|---|
| Selected tube reclaim rubber | 90 |
| Latex crepe rubber | 10 |
| Whiting | 40 |
| Wood rosin | 140 |
| Heptane (volatile solvent) | 360–450 |

The wood rosin is preferably the "FF" grade or, even more preferably, a heat-treated wood rosin known as "Solros" wood rosin.

The reclaim rubber, latex and whiting (which serves as a reinforcing pigment and is optional) are compounded together on the ordinary type of rubber mill and milled for 30–40 minutes. This milled base is then transferred to a heavy duty internal mixer (such as a Baker Perkins Mogul type mixer) and mixed for 1–2 hours with 10–20 lbs. steam pressure in the heating jacket. The rosin is then added and mixing is continued for another hour. The jacket steam is then turned off and the mass cooled. The solvent, preferably heptane, but substitutable by other volatile rubber solvents as benzol, naphtha and high-test gasoline, is then added and mixing is continued until the whole mass is homogeneous, generally requiring about ½ hour. The resulting primer composition or solution is then ready for application to the backing.

In this method of compounding, the reclaim rubber becomes plasticized by the mechanical working in the presence of heat and air, and is further plasticized by the rosin which is thoroughly incorporated therewith.

While raw rubber may be employed in place of reclaim rubber (which is in a partially vulcanized state), the latter is much to be preferred because it makes for a primer coating having a greater bonding action, due to the higher adhesion value of the reclaim rubber resulting from the heating cycle and amount of break down experienced in the reclaiming process. This is obtained without sacrifice or firmness or coherency of the primer coating, due to the high cohesiveness of the reclaim rubber resulting from its prior vulcanization. If raw rubber were subjected to the same treatment, it would have softness and stickiness but would lack adequate cohesiveness. Instead of using reclaim rubber, a fresh partially vulcanized rubber may be employed.

The whiting employed in the primer serves as a reinforcing pigment, imparting greater cohesiveness and firmness. It does not prevent transparency, for the primer coating is quite thin.

Adhesive Example 1

|  | Parts |
|---|---|
| Latex crepe | 132 |
| Zinc oxide | 165 |
| Blue pigment mixture | 39.5 |
| No. 10 wood rosin | 72.5 |
| "Flectol B" (antioxidant) | 1.5 |
| Heptane (volatile solvent) | 750 |

The blue pigment mixture is exemplified by "Du Pont rubber blue YD," a milled mixture of equal parts latex crepe and dry blue pigment. This may be omitted.

The latex crepe, zinc oxide and pigment mixture are milled on a rubber mill for about 10 minutes, at a temperature of about 140–150° F., and the resulting base is cut into small pieces.

The rosin is dissolved in an equal amount of the solvent and the "Flectol B" is likewise dissolved in a portion of the solvent. The balance of the solvent (to make a total of 750 parts) is placed in a suitable churn and the solutions of rosin and "Flectol B," and the milled base, are added. The mixture is mixed until homogeneous, involving mixing for about 40 hours at a temperature of about 70–100° F.

The indicated heptane may be substituted for by another volatile rubber solvent such as benzol or naphtha. It will be understood that the proportion of solvent may be varied to produce the desired viscosity of the adhesive composition, which in any case should be sufficiently low to insure thorough saturation of the paper reinforcing sheet. The amount of hydrocarbon solvent required may be reduced by incorporating alcohol as a viscosity-reducer, which may be denatured ethyl alcohol (for example containing 5 volumes of methyl alcohol or ethyl acetate per 100 volumes of 190 proof ethyl alcohol) or may be methyl alcohol, and which may be used in amount equal to 10 to 20% of the hydrocarbon solvent.

In the above example "Flectol B" (a liquid condensation product of acetone and aniline) is used as an antioxidant to improve the rubber aging qualities. Other suitable antioxidants or age-resisters are: "Flectol H" (a solid condensation product of acetone and aniline), "Solux" (p-hydroxy-N-phenylmorpholine), "Agerite Resin" (aldol-alpha-naphthylamine reaction product), "Antox," beta-naphthol, "Agerite Alba" and "Agerite White." Those which are soluble in the rubber solvent may be added directly, otherwise they may be milled into the rubber during the initial milling.

Instead of wood rosin, a synthetic tack-producing resin may be used, such as cumarone resin.

The coloring pigment serves also as a reinforcing pigment, as does the zinc oxide, giving greater cohesiveness (firmness) to the adhesive coating. These pigments may be omitted or reduced in order to produce transparent adhesive coatings, and a transparent, semi-transparent or translucent adhesive tape product. By omitting all pigment material and employing a Troya Tissue sheet of 1 or 1½ mils thickness, a transparent tape will be obtained. The adhesive impregnant with which the paper is saturated serves to transparentize it.

When a coloring pigment is employed, in conjunction with a transparent backing such as a film of Cellophane, the adhesive tape appears to have a glossy colored back, which renders it very attractive.

The above rubber-resin type of adhesive forms adhesive coatings which are not only normally tacky and pressure-sensitive, and non-offsetting, but which are water-insoluble, non-hygroscopic and moistureproof.

Using the above formula to impregnate and double-coat Troya Tissue as shown in Fig. 2 and accompanying description, to produce a thoroughly unified paper having an adhesive coating on each side which is about 0.9 mil thick, the weight of adhesive solids is indicated by the following illustrative data: a 4 in. by 6 in. piece of 1½ mil thickness paper weighs 5.2 grains before treatment and takes up approximately 26–30 grains of adhesive; and a similar piece of 2 mil paper, initially weighing 5.8 grains, takes up approximately 28–32 grains of adhesive.

Adhesive Example 2

|  | Parts |
|---|---|
| Isobutylene polymer "medium" | 200 |
| Isobutylene polymer "low" | 200 |
| Soft cumarone resin | 80 |
| Heptane | 1,600 |

The isobutylene polymers are resinous materials, the one designated "medium" having a molecular weight of approximately 80,000 and the one designated "low" a molecular weight of approximately 14,000. The ingredients are placed in a churn and mixed until homogeneous.

The cumarone resin acts as a tack-producer, as does the lower isobutylene polymer. The latter may be omitted and the stated proportion of cumarone resin retained or increased, and the cumarone resin may be substituted for by wood rosin or other tack-producing resin.

This composition forms particularly clear and transparent pressure-sensitive adhesive coatings and is quite effective in transparentizing the paper reinforcing sheet. However, a coloring pigment may be incorporated in producing colored adhesive tape, as illustrated by the following:

Adhesive Example 3

|  | Parts |
|---|---|
| Isobutylene polymer "medium" | 1 |
| Zinc oxide | 0.5 |
| Para toluidine red | 0.2 |
| Wood rosin | 0.5 |
| Hydrogenated methyl abietate | 0.2 |
| Heptane | 7 |

The isobutylene polymer, zinc oxide and coloring ingredient (illustrated by para toluidine red) are first milled on a rubber mill until a uniform plastic composition is secured. This plastic mass is then cut to pieces and placed in a suitable churn with the balance of the ingredients and churned until a homogeneous solution is formed. The wood rosin, which is used in amount less than the isobutylene polymer, serves as a tack-producing agent, so that normally tacky and pressure-sensitive adhesive coatings will be formed. The hydrogenated methyl abietate serves as a plasticizer and may be omitted.

*Separate unifying composition*

| | Parts |
|---|---|
| Latex crepe | 100 |
| Zinc oxide | 100 |
| Rosin | 160 |
| Beta-naphthol (antioxidant) | 1 |
| Oleum spirits (volatile solvent) | 200 |

The rubber and zinc oxide are milled on an ordinary rubber mill for 30 minutes, at about 150–160° F., and then taken off in sheet form and placed in an internal mixer (such as a Baker Perkins Mogul mixer), the heating jacket of which carries steam at 40 lbs. pressure, and which has previously been allowed to warm up. A small proportion of the rosin (say 10–25%) is added to make for lubrication and a lower power requirement, and the mass is mixed for about 8–10 hours, or until reduced to a semi-fluid consistency. This mastication destroys the nerve of the rubber and makes possible a proper impregnation, the mechanical working in the presence of heat and air plasticizing the rubber. The rosin may be omitted from this stage of compounding, but with an increase in the power requirement; and an even greater proportion, or all, of the rosin may be added, but with an increase in the time required for breaking down the nerve of the rubber. If all the rosin is added at the beginning, about 24 hours mixing will be required.

The balance of the rosin is added, care being taken to add slowly to avoid excessive foaming caused by the water evolved from the reaction between the rosin and the zinc oxide, and mixing is continued for another hour. The beta-naphthol is added, and the steam is turned off and cooling water introduced into the heating jacket of the mixer. The oleum spirits is then added with continued mixing for half an hour, or until the mixture is homogeneous. The resultant impregnating composition is then ready for use.

The rubber is preferably latex crepe, but smoked sheets or reclaimed rubber may be used. Reclaimed rubber is less desirable because of its partial degree of vulcanization, which resists breaking down to reduce the viscosity. Since reclaimed rubber ordinarily contains zinc oxide, a reduction may be made in the added zinc oxide, or the latter may be omitted.

The zinc oxide functions both as a reinforcing pigment and as hardening agent for the rosin, part of it reacting with the rosin to saponify the latter, forming zinc abietate. Other basic oxides may be used as hardening agents in place of or in conjunction with zinc oxide to form water-insoluble resinates. Thus a small amount of lime (preferably hydrated lime), for example 1 part in the above formula, may be employed, or a small amount of magnesia. Inert fillers, preferably in the nature of reinforcing pigments, may be substituted for part of the zinc oxide. The filler or pigment should have a particle size, following mastication, which is fine enough to penetrate into the backing. Thus clay, whiting, and lamp black may be used for this purpose.

The rosin may be gum rosin or wood rosin, and may be substituted for in whole or in part by equivalent synthetic or natural resins which blend with rubber. Thus, for example, a part of the rosin in the above formula may be replaced by ester gum or copal resin. While it is preferred to harden the rosin in situ during the compounding, it may be hardened in advance by treatment with zinc oxide, etc.

The oleum spirits is a petroleum hydrocarbon solvent of medium volatility, and may be substituted for by other volatile hydrocarbon solvents such as benzol, heptane, naphtha and gasoline.

The preferred range of composition in the above formula is as follows per 100 parts of rubber: 75–125 parts of zinc oxide and 140–180 parts of rosin. The solvent ratio should preferably be substantially as indicated, although some variation may be desired depending on the proportions of other ingredients and the degree of breakdown of the rubber; and in some cases a more dilute composition may be desired if it is intended to only partly unify the paper in the pretreatment bath.

The foregoing unifying composition provides a relatively non-tacky, water-insoluble and non-hygroscopic impregnant for the paper and one to which rubber or resin-containing adhesive coatings will firmly anchor.

What we claim is as follows:

1. As a new article of manufacture, a laminated pressure-sensitive adhesive tape substantially transparent to reflected light when mounted upon a surface, which comprises a pliable, non-fibrous, transparent backing; and an integral multi-layer adhesive coat attached thereto, said coat comprising a first layer of a substantially transparent, pressure-sensitive, adhesive composition; a thin, unsized, unfilled, porous paper overlying said first layer; and a second layer of a substantially transparent, pressure-sensitive, adhesive composition overlying said paper; said adhesive compositions impregnating said paper from both sides and holding said paper in suspension therein as a strengthening bond to form therewith an integral, multi-layer adhesive coat, thereby providing a laminated adhesive tape having an unusually firm bond between the backing and the adhesive coat and being transparent to reflected light when mounted upon a surface.

2. As a new article of manufacture, a laminated pressure-sensitive adhesive tape which comprises a pliable, non-fibrous, film backing; and an integral, multi-layer adhesive coat attached thereto, said coat comprising a first layer of a pressure-sensitive adhesive composition; a thin porous paper overlying said first layer; and a second layer of a pressure-sensitive adhesive composition overlying said paper; said adhesive compositions impregnating said paper from both sides and holding said paper in suspension therein as a strengthening bond to form therewith an integral, multi-layer adhesive coat, thereby providing a laminated adhesive tape having an unusually firm bond between the backing and the adhesive coat.

3. An adhesive tape sheet wound upon itself in roll form and comprising a flexible non-fibrous film backing firmly united to a coextensive thin flexible unified tissue paper reinforcing sheet having on each side an integral coating of a highly coherent normally tacky and pressure-sensitive adhesive, said tissue paper being thoroughly impregnated by a flexible fibre-binding composition, forming a permanently unitary flexible adhesive tape product which may be removed from surfaces to which temporarily affixed without delamination, splitting, or offsetting of adhesive.

4. An adhesive tape sheet wound upon itself in roll form and comprising a flexible non-fibrous film backing firmly united to a coextensive thin flexible unified tissue paper reinforcing sheet having on each side an integral coating of a highly coherent normally tacky and pressure-sensitive water-insoluble moistureproof non-hygroscopic adhesive, said tissue paper being thoroughly impregnated by a water-insoluble moistureproof non-hygroscopic flexible fibre-binding composition, forming a permanently unitary tape product which may be unwound without delamination, splitting, or offsetting of adhesive, and which is thin, flexible and strong.

5. An adhesive tape sheet wound upon itself in roll form and comprising a flexible non-fibrous transparent film backing firmly united to a coextensive thin flexible unified tissue paper reinforcing sheet which is transparent or semi-transparent, said tissue paper being thoroughly impregnated by a flexible transparent or semi-transparent fibre-binding composition and having on each side an integral coating of transparent or semi-transparent non-offsetting normally tacky and pressure-sensitive adhesive, forming a transparent or semi-transparent permanently unitary adhesive tape which will not conceal the coloring or markings of surfaces to which applied.

6. An adhesive tape sheet wound upon itself in roll form and comprising a flexible non-fibrous transparent film backing having a glossy back surface and firmly united to a coextensive thin flexible unified tissue paper reinforcing sheet having on each side an integral coating of a highly coherent normally tacky and pressure-sensitive adhesive, the interposed adhesive coating being colored and visible through the backing so that the back face has a glossy colored appearance, said tissue paper being thoroughly impregnated by a flexible fibre-binding composition, forming a permanently unitary flexible adhesive tape product which may be removed from surfaces to which temporarily affixed without delamination, splitting or offsetting of adhesive.

7. An adhesive tape sheet wound upon itself in roll form and comprising a flexible non-fibrous film backing firmly united to a coextensive sheet of long-fibred rope tissue paper having a thickness of approximately 1 to 4 mils and thoroughly impregnated and unified by a flexible water-insoluble fibre-binding composition, the tissue paper having on each side an integral coating of a highly coherent water-insoluble normally tacky and pressure-sensitive adhesive; which adhesive sheet may be unwound, and removed from surfaces to which temporarily affixed, without delamination or offsetting of adhesive.

8. An adhesive tape sheet wound upon itself in roll form and comprising a flexible metal foil backing firmly united to a coextensive thin flexible unified tissue paper reinforcing sheet having on each side an integral coating of a highly coherent normally tacky and pressure-sensitive adhesive, said tissue paper being thoroughly impregnated by a flexible fiber-binding composition, forming a permanently unitary flexible adhesive tape product which may be removed from surfaces to which temporarily affixed without delamination, splitting, or offsetting of adhesive.

9. An adhesive tape sheet wound upon itself in roll form and comprising a flexible metal foil backing firmly united to a coextensive sheet of long-fibred rope tissue paper having a thickness of approximateley 1 to 4 mils and thoroughly impregnated and unified by a flexible water-insoluble fibre-binding composition, the tissue paper having on each side an integral coating of a highly coherent water-insoluble normally tacky and pressure-sensitive adhesive; which adhesive sheet may be unwound, and removed from surfaces to which temporarily affixed, without delamination or offsetting of adhesive.

10. An adhesive tape sheet comprising a flexible non-fibrous film backing firmly united to a coextensive thin flexible strong tissue paper reinforcing sheet of high initial porosity impregnated and unified by a highly coherent normally tacky and pressure-sensitive adhesive and having an integral coating of said adhesive on each side, forming a permanently unitary flexible adhesive tape product which may be removed from surfaces to which temporarily affixed without delamination, splitting, or offsetting of adhesive.

11. A thin flexible adhesive tape sheet comprising a flexible non-fibrous film backing permanently united to a coextensive reinforcing sheet of tough long-fibred rope paper of initial open texture and high porosity and having a thickness of approximately 1 to 4 mils, said paper being thoroughly impregnated with a normally tacky and pressure-sensitive non-offsetting adhesive, the adhesive unifying the paper and uniting it to the backing, and providing a coextensive exposed adhesive surface for the adhesive sheet.

12. A thin flexible adhesive tape sheet wound upon itself in roll form and comprising a flexible non-fibrous film backing having a thickness of not over about 2 mils and permanently united to a coextensive unified reinforcing sheet of tough long-fibred rope paper of initial open texture and high porosity and having a thickness of approximately 1 to 4 mils, said unified paper sheet being impregnated and coated on each side with a highly coherent water-insoluble normally tacky and pressure-sensitive rubber-resin type adhesive, forming a permanently unitary product of not over about 8 mils thickness which may be unwound and may be removed from smooth surfaces to which temporarily affixed without delamination, splitting or offsetting of adhesive.

13. An adhesive tape sheet comprising a flexible non-fibrous transparent film backing, a coextensive strong tissue paper reinforcing sheet of initial open texture and high porosity, and a coextensive flexible layer of normally tacky and pressure-sensitive transparent adhesive bonded to said backing and penetrating, unifying and transparentizing said paper and in which said paper is embedded so that a continuous adhesive surface is exposed, said adhesive tape sheet transmitting light so that the sheet will not conceal the coloring or markings of surfaces to which applied and having its parts so firmly united that it may be unwound from rolls thereof without delamination or offsetting of adhesive.

14. An adhesive tape sheet comprising a flexible non-fibrous transparent film backing, a coextensive strong tissue paper reinforcing sheet of initial open texture and high porosity, and a coextensive flexible layer of normally tacky and pressure-sensitive adhesive containing coloring material, bonded to said backing and penetrating and unifying said paper and in which said paper is embedded so that a continuous adhesive surface is exposed, the coloring material being visible through the backing so that the back face has a glossy colored appearance, and the sheet having its parts so firmly united that it may be unwound from rolls thereof without delamination or offsetting of adhesive.

15. An adhesive tape sheet comprising a flexible metal foil backing firmly united to a coextensive thin flexible strong tissue paper reinforcing sheet of high initial porosity impregnated and unified by a highly coherent normally tacky and pressure-sensitive adhesive and having an integral coating of said adhesive on each side, forming a permanently unitary flexible adhesive tape product which may be removed from surfaces to which temporarily affixed without delamination, splitting, or offsetting of adhesive.

16. An adhesive tape sheet comprising a unified sheet of thin tough paper which is coated on both sides with a highly coherent normally tacky and pressure-sensitive water-insoluble adhesive, a coextensive flexible non-fibrous film backing, and an interposed primer coating firmly united to one surface of the backing, and to the adhesive coating on one side of the paper, with a strength of unification greater than the adhesion between the outer adhesive coating and the back surface of the backing when the adhesive sheet is rolled upon itself, forming a permanently unitary product which may be unwound from rolls without delamination, splitting, or offsetting of adhesive, and which is thin, flexible and strong.

17. An adhesive tape sheet comprising a unified sheet of thin tough paper having an integral coating on each side of a highly coherent normally tacky and pressure-sensitive water-insoluble adhesive, a coextensive flexible non-fibrous cellulosic film backing, and an interposed primer coating comprised of plasticized partially vulcanized rubber and a greater amount of resin, said primer coating permanently uniting one surface of the backing to the adhesive coating on one side of the paper, forming a permanently unitary product which is thin, flexible and strong.

18. A thin flexible adhesive tape sheet comprising a sheet of tough paper having a thickness of 1 to 4 mils, initially characterized by open texture and high porosity, which is unified and coated on both sides with a highly coherent normally tacky and pressure-sensitive adhesive comprised of latex rubber and a lesser proportion of a tack-producing resin, a coextensive thin flexible non-fibrous cellulosic backing having a lustrous back surface, and a primer coating permanently uniting the coated paper to the backing and comprised of reclaim rubber plasticized in the presence of heat and air and mixed with a larger amount of wood rosin, forming a unitary product which may be unwound from rolls without delamination, splitting, or offsetting of adhesive.

19. The method of making an adhesive tape sheet which comprises providing each side of a unified thin paper sheet with an integral coating of a normally tacky and pressure-sensitive non-offsetting adhesive, by applying the adhesive in the form of a solution in a volatile solvent and subsequently drying the sheet; coating one side of a thin flexible non-fibrous film backing with a primer which has a strong affinity for said adhesive, by applying in a solution in a volatile solvent and subsequently allowing the solvent to evaporate; and thereafter bringing together the resultant primed backing and coated paper so that the primer coating contacts the adhesive, and squeezing together to form a permanently unitary product.

20. The method of making an adhesive tape sheet which comprises applying a highly coherent normally tacky and pressure-sensitive adhesive to a thin tough tissue paper sheet of high initial porosity so as to impregnate and unify the paper and coat it on both sides with adhesive, and then permanently uniting the resultant double coated paper to a thin flexible non-fibrous film backing by squeezing them together, so as to obtain a flexible permanently unitary product, said union being effected when the adhesive is essentially in its final state, as the result of the pressure-sensitive property thereof.

WALDO KELLGREN.
HUBERT J. TIERNEY.
RICHARD GURLEY DREW.

REFERENCES CITED

The following references are of record in the file of this patent:

UNITED STATES PATENTS

| Number | Name | Date |
|---|---|---|
| 1,259,787 | Segall | Mar. 19, 1918 |
| 1,845,299 | Leonard | Feb. 16, 1932 |
| Re. 19,128 | Drew | Apr. 3, 1934 |
| 2,038,325 | Van Cleef | Apr. 21, 1936 |
| 2,057,042 | McLaurin | Oct. 13, 1936 |
| 2,073,894 | Wood | Mar. 16, 1937 |
| 2,084,878 | Van Cleef | June 22, 1937 |
| 2,085,197 | Lester | June 29, 1937 |
| 2,104,057 | Scott | Jan. 4, 1938 |
| 2,105,728 | Geller | Jan. 18, 1938 |
| 2,177,627 | Drew | Oct. 31, 1939 |

FOREIGN PATENTS

| Number | Country | Date |
|---|---|---|
| 302,588 | Great Britain | Dec. 15, 1929 |
| 722,187 | France | Dec. 28, 1931 |